United States Patent

[11] 3,593,947

[72] Inventor Ralph Johnson
Huntington, N.Y.
[21] Appl. No. 882,959
[22] Filed Dec. 8, 1969
[45] Patented July 20, 1971
[73] Assignee Sylvania Electric Products, Inc.

[54] TAPE TRANSPORT APPARATUS
5 Claims, 2 Drawing Figs.

[52] U.S. Cl. .......... 242/192, 242/202
[51] Int. Cl. .......... G03b 1/04, G11b 15/32
[50] Field of Search .......... 242/54.1, 187, 192, 202; 179/100.2 R, 100.2 Z

[56] References Cited
UNITED STATES PATENTS 3,370,803 2/1968 Newell .......... 242/192
3,482,800 12/1969 Barnett et al. .......... 242/192
3,489,369 1/1970 Ganske et al. .......... 242/187

*Primary Examiner*—Leonard D. Christian
*Attorneys*—Norman J. O'Malley and Theodore Jay, Jr.

ABSTRACT: A tape transport utilizes a reversible rotatable capstan interposed between two spaced tape wound spools and making resilient peripheral contact with a selected point on each spool. The direction of rotation of the capstan determines which spool acts as a supply spool and which spool acts as a takeup spool.

Cams, cam followers, first means coupled to and extending between the followers, and second means cooperating with the first means and coupled to the drive shaft of the capstan establish a first pressure urging the takeup spool toward the capstan and applied at the point of arrival which is larger than and oppositely directed to a second pressure urging the supply spool toward the capstan and applied at the point of departure.

PATENTED JUL 20 1971 3,593,947

INVENTOR
RALPH JOHNSON
BY Theodore Jay Jr.
ATTORNEY

TAPE TRANSPORT APPARATUS

BACKGROUND OF THE INVENTION

A known type of tape transport employs a reversible rotatable capstan interposed between two spaced tape wound spools and making peripheral resilient contact at the takeup spool at the point of tape arrival and at the supply spool at the point of tape departure. Typically, the tape is a magnetic tape and is coupled to a recording head at a position intermediate the spools.

The direction of rotation of the capstan determines which spool acts as a supply spool and which spool acts as a takeup spool. These spools interchange supply and takeup functions when the direction of capstan rotation is reversed. Each spool is provided with an axially extending shaft which rotates therewith.

The takeup roll at the point of tape arrival is urged against the capstan by a first pressure which is oppositely directed to and larger than a second pressure urging the supply roll against the capstan at the point of tape departure. The difference between these pressures, the differential pressure, remains essentially constant in magnitude regardless of the direction of tape movement, but must be reversed in direction each time the spools interchange supply and take up functions.

My invention is directed toward new apparatus adapted to cooperate with the drive shaft of the capstan and the spools in order to maintain proper differential pressures during normal operation and, during instants in which reversals ensue, to reverse the direction of the differential pressure in synchronization with the reversal of direction of tape feed. This apparatus is characterized by long term durability and efficiency in operation.

SUMMARY OF THE INVENTION

In my invention, a first arm is pivotally secured at one end to a first fixed pivot point and is rotatably secured at second point displaced therealong to one of the spool shafts. A second arm is pivotally secured at one end to a second fixed pivot point spaced from the first pivot point and is rotatably secured at a second point displaced therealong to the other of the spool shafts. The arms extend at right angles to the corresponding shafts.

A first cam is secured to and extends along the first arm. A second cam is secured to and extends along the second arm. The surfaces on these cams point away from each other and the capstan. Each cam has a cam follower riding on its surface. Each follower can move between a first extreme position disposed adjacent a top edge of the cam and the corresponding pivot point and a second extreme position adjacent the bottom edge of the cam and the corresponding spool shaft.

First means connected to both followers and extending therebetween establishes constant tension between the followers.

Second means cooperating with the first means and the capstan drive shaft causes the follower associated with the takeup spool to be in the second extreme position while the follower associated with the supply spool to be in the first extreme position, these positions being maintained regardless of the direction of tape movement. These follower positions automatically establish the proper magnitude and direction of differential pressure required.

DETAILED DESCRIPTION OF PREFERRED EMBODIMENTS

Figure 1:
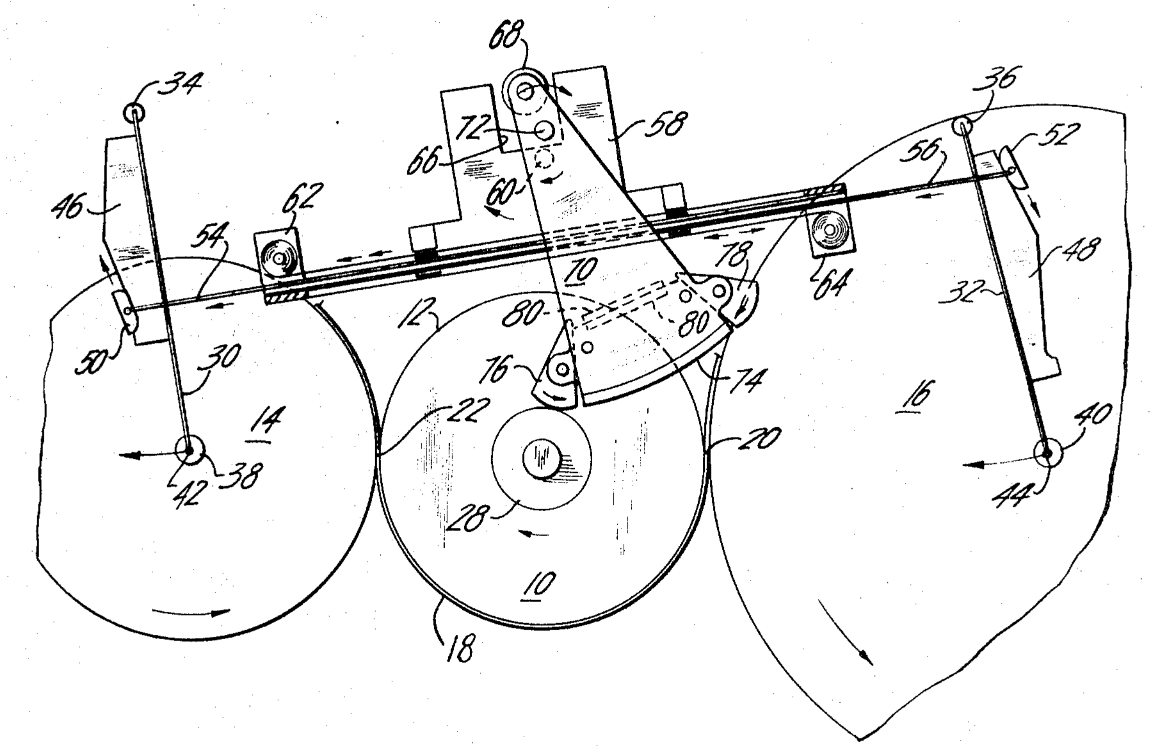
FIG. 1 is a diagrammatic view of my invention showing the relationship of capstan and supply and takeup spools for one direction of tape feed.
Figure 2:
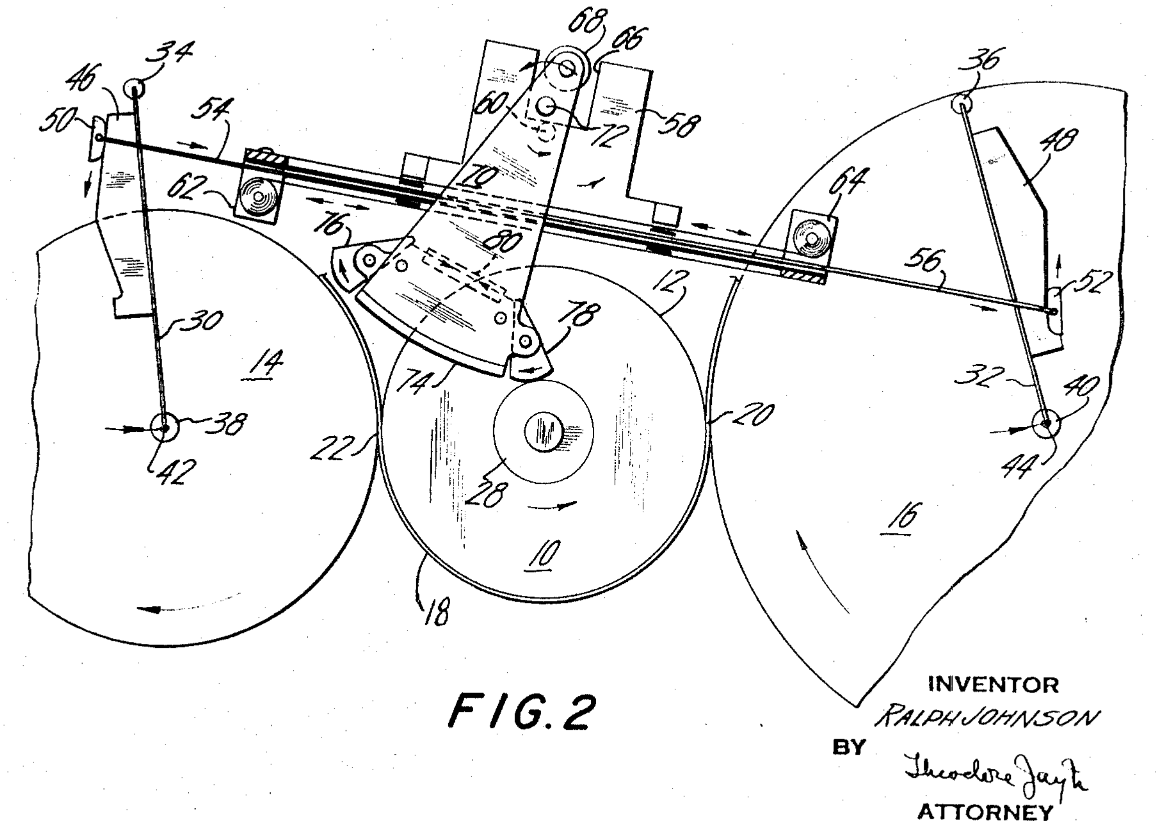
FIG. 2 is a view similar to FIG. 1 but showing the relationship of capstan and supply and takeup spools when the direction of tape feed is reversed.

Referring now to FIGS. 1 and 2, a drive capstan 10 has a resilient peripheral surface 12 driving flangeless spools 14 and 16 carrying tape 18 at the point of departure of the tape from the spool acting as the supply spool and at the point of tape arrival on to the spool acting as the takeup spool. In FIG. 1, spool 16 is the supply spool, 20 the point of departure, spool 14 is the takeup spool and 22 is the point of arrival. The capstan rotates clockwise. When the direction of capstan rotation is reversed, the position of points of arrival and departure are reversed and the functions of supply and takeup of the spools are also reversed as shown in FIG. 2. The tape, as it moves between the points of arrival and departure, passes around drive capstan 10. The capstan has a drive motor with drive shaft 28.

The takeup spool at the point of tape arrival is urged against the capstan by a first pressure which is oppositely directed to and larger than a second pressure which urges the supply spool against the capstan at the point of tape departure. The difference between these two pressures, the differential pressure, remains essentially constant in magnitude regardless of the direction of tape movement but must be reversed in direction, each time the spools interchange supply and takeup functions.

My invention is directed toward apparatus for maintaining proper differential pressures during normal operation and, during instants in which reversals ensue, to reverse the direction of the differential pressure in synchronization with the reversal of direction of tape feed.

Arms 30 and 32 are each pivotally secured at one end to a corresponding one of fixed pivot points 34 and 36. Each of spools 14 and 16 has a corresponding axial shaft 38 or 40 which rotates therewith. Shafts 38 and 40 are each rotatably secured at one end to a corresponding one of arms 30 and 32 at a corresponding point 42 or 44 remote from the corresponding one of pivot points 34 and 36. Each shaft 38 or 40 extends at right angles to the corresponding arm.

Cams 46 and 48 are each secured to and extend along the length of a corresponding one of arms 30 and 32. Each cam has a cam surface pointing away from the capstan and from the other cam. Each cam is provided with its own cam follower 50 or 52. Each follower rides over the corresponding cam surface between a first extreme position disposed adjacent a top edge of the cam and the corresponding pivot point 34 or 36 and a second extreme position disposed adjacent a bottom edge of the cam and the corresponding shaft 38 or 40. When a follower is in the second position, it is disposed in a recess and cannot be accidentally discharged therefrom. As will be explained below, in normal operation, one cam follower will be in one of the two extreme positions while the other cam follower will be in the other of the two positions. More particularly, the follower associated with the takeup spool will be in the second position and the other follower will be in the first position.

Each follower is connected by a corresponding linkage 54 or 56 to opposite sides of a member 58 pivotable about a third fixed pivot point 60 disposed between and spaced from points 34 and 36. Constant tension springs 62 and 64 carried by the member maintain constant tension between the followers.

Member 58 has a central slot 66 in which is disposed a roller 68 secured rotatably to one end of cam 70 and extending at right angles thereto. Cam 70 is pivotable about a fourth fixed point 72.

Cam 70 has at its other end a cam surface 74 with subcams 76 and 78 pivotally secured to points on opposite sides of surface 74. Subcams 76 and 78 are linked by a spring 80. Surface 74 and subcams 76 and 78 are disposed adjacent drive shaft 28. The subcams and surface can be in contact with the periphery of shaft 28. Depending upon the direction of rotation, one or the other of the subcams will be in contact with the shaft 28 and the surface 74 and other subcam will be rotated past and out of contact with the shaft 28. This action moves roller 68 in slot 66 to pivot member 58 and moves the followers to the desired extreme positions.

As previously indicated, it is necessary to maintain proper differential pressure between the takeup spool and capstan at the point of tape arrival and between the supply spool and capstan at the point of tape departure. This is accomplished by varying the distance or separation length between fixed point 34 and follower 50 on cam 46 on the one hand and the separation length between fixed point 36 and follower 52 on cam 48 on the other hand. In particular, when spool 16 is functioning as a supply spool, and its follower 52 is in the first extreme position, the separation length between point 36 and follower 52 is relatively small. At the same time, spool 14 is functioning as a takeup spool, follower 50 is in the second extreme position and the separation between point 34 and follower 50 is relatively large. The mechanical advantage resulting from this geometry, as developed by the various linkages, cams and pivot member is employed to maintain a larger pressure between spool 14 and the capstan at the point of arrival than the pressure maintained between spool a6 and the capstan at the point of departure. When the spools interchange functions, the distance between point 34 and follower 50 becomes much smaller than the distance between point 36 and follower 52 and the desired reversal of differential pressure is achieved. The mechanical advantage is defined by the ratio of the larger separation to the smaller separation. The actual value employed will vary depending upon the design parameters.

What I claim is:

1. Tape transport apparatus utilizing a reversible rotatable capstan interposed between two spaced tape wound spools and making resilient peripheral contact with a selected point on each spool, said capstan having an axially extending drive shaft, the direction of rotation of said capstan determining which spool acts as a supply spool and which spool acts as a takeup spool, said spools interchanging supply and takeup functions when the direction of capstan rotation is reversed, each spool having an axially extending shaft which rotates therewith, said apparatus comprising:

two spaced fixed pivot points;

a pair of arms, each arm being pivotally secured at a first selected point therealong to a corresponding one of said pivot points and being rotatably secured at a second and physically displaced point therealong to a corresponding one of said spool shafts, each arm extending at right angles to the corresponding shaft;

a pair of cams, each cam being secured to and extending along a corresponding arm, each cam having a cam surface pointing away from the capstan and from the other cam;

a pair of cam followers, each follower riding on the cam surface of the corresponding cam between a first extreme position adjacent the corresponding pivot point and a second extreme position adjacent the corresponding spool shaft;

first means extending between and interconnecting said followers to maintain constant tension therebetween; and second means cooperating with said first means and the drive shaft to maintain the follower associated with the spool having the takeup function in its second position and, at the same time, to maintain the other follower in its first position.

2. Apparatus as set forth in claim 1 wherein said first means includes linkages and constant tension springs.

3. Apparatus as set forth in claim 2 wherein said first means includes a pivotable member having a slot.

4. Apparatus as set forth in claim 3 wherein said second means includes a third cam having a roller disposed in the slot of the pivotable member.

5. Apparatus as set forth in claim 4 wherein said third cam has a surface adapted for peripheral contact with the surface of the drive shaft.